United States Patent
Suda et al.

(10) Patent No.: US 9,793,730 B2
(45) Date of Patent: Oct. 17, 2017

(54) MOTOR-DRIVEN APPLIANCE

(71) Applicant: MAKITA CORPORATION, Anjo-shi, Aichi (JP)

(72) Inventors: Hidekazu Suda, Anjo (JP); Takuya Kusakawa, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 309 days.

(21) Appl. No.: 14/819,980

(22) Filed: Aug. 6, 2015

(65) Prior Publication Data

US 2016/0064984 A1 Mar. 3, 2016

(30) Foreign Application Priority Data

Aug. 29, 2014 (JP) ................. 2014-176153

(51) Int. Cl.
*H02J 7/00* (2006.01)
*H02J 50/10* (2016.01)

(52) U.S. Cl.
CPC ............ *H02J 7/0063* (2013.01); *H02J 50/10* (2016.02); *H02J 2007/0095* (2013.01)

(58) Field of Classification Search
CPC .. H02J 7/0063; H02J 50/10; H02J 2007/0095; G06F 1/26; G08C 19/12

USPC ........................................................ 307/140
See application file for complete search history.

(56) References Cited

FOREIGN PATENT DOCUMENTS

| DE | 102 16 206 A1 | 11/2003 |
| DE | 10 2010 029 729 A1 | 12/2011 |
| JP | 4563259 B2 | 10/2010 |

OTHER PUBLICATIONS

Jun. 15, 2016 Office Action issued in German Patent Application No. 10 2015 010 860.3.

*Primary Examiner* — Robert Deberadinis
(74) *Attorney, Agent, or Firm* — Oliff PLC (57) ABSTRACT

A motor-driven appliance comprises a drive source for driving a tool, a control unit, a power supply unit, a switch unit, a receiving unit, a supply signal output unit, and a data communication unit. The power supply unit generates a control voltage for operating the control unit. The switch unit supplies the control voltage to the control unit and stops supply of the control voltage to the control unit. The control voltage is supplied to the control unit while a given supply signal is inputted to the switch unit. The supply signal output unit outputs, to the switch unit, the supply signal for supplying the control voltage to the control unit when the receiving unit receives the electromagnetic wave while the supply of the control voltage to the control unit is stopped. The data communication unit outputs, to the control unit, the data contained in the electromagnetic wave.

8 Claims, 2 Drawing Sheets

MOTOR-DRIVEN APPLIANCE

CROSS-REFERENCE TO RELATED APPLICATIONS

This application claims the benefit of Japanese Patent Application No. 2014-176153 filed Aug. 29, 2014 in the Japan Patent Office, the disclosure of which is incorporated herein by reference.

BACKGROUND

The present disclosure relates to a motor-driven appliance.

A motor-driven appliance, such as a rechargeable driver and a rechargeable mower, that operates with a battery as a power source generally comprises a control circuit that controls a drive source (for example, a motor) of a tool and a power supply circuit that generates a control voltage for operating the control circuit on the basis of power of the battery.

As a motor-driven appliance configured as above, an electric power tool is known that is provided, for the purposes of reducing power consumption, with a power-saving function of cutting off the control voltage to the control circuit when a given period of time elapses after operation of the drive source has been stopped (see, for example, JP4563259). When a trigger switch is turned on after the control voltage has been cut off, supply of the control voltage to the control circuit is resumed.

According to an electric power tool described in JP4563259, it is possible to reduce power consumed by the control circuit, because the voltage supply to the control circuit is cut off to thereby completely stop operation of the control circuit when the given period of time elapses after the operation of the drive source has been stopped.

SUMMARY

In recent years, it has been proposed to provide a function of wireless communication with an external device to motor-driven appliances of various types. With the function of wireless communication with an external device, it is possible, for example, to set various setting values in the control circuit from the external device and to read various kinds of information, including various set states and operational states, from the control circuit.

However, according to the motor-driven appliance having the power-saving function as described in JP4563259, even if wireless communication is attempted from the external device while the supply of the control voltage is stopped by the activated power-saving function, the wireless communication is naturally impossible because the control circuit is not in operation.

In one aspect of the present disclosure, it is desirable that, even while a control unit that has functions of controlling a drive source and of obtaining data from an external device is not in operation because the supply of the operating voltage to the control unit is stopped, the control unit can be brought into operation to obtain the data from the external device when an electromagnetic wave for wireless communication is received from the external device.

A motor-driven appliance according to one aspect of the present disclosure comprises a drive source, a control unit, a power supply unit, a switch unit, a receiving unit, a supply signal output unit, and a data communication unit.

The drive source drives a tool element. The control unit has a function of controlling operation of the drive source and a function of obtaining data wirelessly transmitted from an external device. The power supply unit generates a control voltage for operating the control unit. The switch unit is provided to supply the control voltage to the control unit and to stop supply of the control voltage to the control unit so that the control voltage is supplied to the control unit at least while a given supply signal is inputted to the switch unit. The receiving unit is capable of receiving an electromagnetic wave transmitted from the external device. The supply signal output unit outputs, to the switch unit, the supply signal for supplying the control voltage to the control unit when the receiving unit receives the electromagnetic wave while the supply of the control voltage to the control unit is stopped by the switch unit. The data communication unit outputs, to the control unit, the data contained in the electromagnetic wave received by the receiving unit. A state in which the supply of the control voltage to the control unit is stopped by the switch unit is hereinafter referred to also as a power supply stop state.

According to the motor-driven appliance configured as such, even in the power supply stop state, the supply signal is outputted to the switch unit when the receiving unit receives the electromagnetic wave. When inputted with the supply signal, the switch unit starts supplying the control voltage to the control unit. Thus, even in the power supply stop state, it is possible to bring the control unit into operation to obtain the data from the external device when the electromagnetic wave for wireless communication is received from the external device.

The receiving unit may be configured to comprise a coil and an activation operation unit. The coil is a component for receiving the electromagnetic wave from the external device. The activation operation unit performs a given activation operation to cause the supply signal output unit to output the supply signal by an electromotive force induced in the coil by the electromagnetic wave received by the coil.

According to the motor-driven appliance configured as such, when the coil receives the electromagnetic wave from the external device and the received electromagnetic wave induces the electromotive force in the coil, the activation operation is performed with the induced electromotive force. That is, the activation operation at least can be performed with energy of the electromagnetic wave from the external device without consuming power within the motor-driven appliance. This enables reduction in power consumption of the motor-driven appliance.

The supply signal output unit may output the supply signal for a specified period of time when the receiving unit receives the electromagnetic wave while the supply of the control voltage to the control unit is stopped by the switch unit. Power required to output the supply signal can be reduced by output of the supply signal for the specified period of time, which is to be stopped when the specified period of time elapses. This can further enhance a power saving effect of the motor-driven appliance.

The above-described specified period of time may be as long as a given starting-operation time, or longer. Specifically, the starting-operation time is a time required from when the output of the supply signal is started till when the control unit is activated with the supply of the control voltage thereto from the power supply unit and the control unit starts a specific operation. The specified period of time as long as or longer than the starting-operation time allows the control unit to be securely activated from the power supply stop state to thereby start the specific operation.

In a configuration in which, after the output of the supply signal has been started, the output of the supply signal is stopped when the specified period of time elapses, to thereby stop the supply of the control voltage to the control unit again, operation of the control unit could be stopped in a state where the control unit has not normally completed obtainment of the data from the external device, depending on the length of the specified period of time.

Thus, the control unit may be configured such that the control unit, after being activated, can continue the supply of the control voltage by itself. Specifically, the power-driven appliance comprises a power holding unit. The power holding unit causes the switch unit to continue the supply of the control voltage to the control unit while a given power holding signal is outputted from the control unit, irrespective of presence or absence of the output of the supply signal from the supply signal output unit. The control unit, after being activated, starts outputting the power holding signal and, when a given stop condition is satisfied, stops output of the power holding signal. The above specific operation is to output the power holding signal.

According to the motor-driven appliance configured as such, the output of the supply signal from the supply signal output unit to the switch unit is continued at least until the control unit starts the output of the power holding signal so that the supply of the control voltage to the control unit is continued. Once the output of the power holding signal from the control unit is started, even when the supply signal is discontinued thereafter, the supply of the control voltage to the control unit is continued as long as the power holding signal is outputted. This enables the control circuit to securely obtain the data from the external device when the control unit is activated from the power supply stop state.

If the motor-driven appliance has a battery to supply, to the drive source and the power supply unit, power for operating the drive source and the power supply unit, the supply signal output unit may be configured to comprise a power storage unit and a signal output control unit. The power storage unit is a component that is capable of storing electric power. The signal output control unit starts the output of the supply signal by power based on the battery, and also causes the power storage unit to store power by the power based on the battery for a given period of time when the receiving unit receives the electromagnetic wave while the supply of the control voltage is stopped by the switch unit. After the given period of time has elapsed, the output of the supply signal is continued by the power stored in the power storage unit for a period of time corresponding to an amount of stored power.

According to the motor-driven appliance configured as such, the supply signal can surely be outputted by the power of the battery irrespective of presence or absence of the control voltage. It is only for the given period of time that the power storage unit stores power by the battery, and the output of the supply signal is continued thereafter by the power stored in the power storage unit to thereby achieve the output of the supply signal for the specified period of time. This ensures the output of the supply signal without increasing power consumption of the battery.

The receiving unit may be configured to output a given activation signal to the signal output control unit for a given period of time when the electromagnetic wave is received. In such a case, the signal output control unit may cause the power storage unit to store power while the activation signal is inputted from the receiving unit to the signal output control unit.

According to the motor-driven appliance configured as such, the receiving unit is required to output the activation signal only for the given period of time, and the signal output control unit can continue the output of the supply signal by the power stored during the given period of time after the given period of time has elapsed. Thus, even if a time during which the receiving unit can output the activation signal is limited to a time shorter than the specified period of time, the output of the supply signal can be continued for the specified period of time.

If the receiving unit is configured to output the activation signal by the electromotive force induced in the coil by receipt of the electromagnetic wave, power consumed to output the activation signal, out of the energy of the received electromagnetic wave, can be reduced. Thus, the output of the supply signal for the specified period of time and the obtainment of the data by the control unit can both be performed successfully.

A power storage capacity of the power storage unit may be a capacity large enough to store, by power storage for the given period of time, power that allows the supply signal output unit to output the supply signal for the specified period of time from a start of the output of the supply signal. With the power storage capacity as such, the specified period of time during which the output of the supply signal is continued can be set at low cost and with ease.

BRIEF DESCRIPTION OF THE DRAWINGS

The present disclosure will be described with reference to the accompanying drawings, in which.

DETAILED DESCRIPTION OF THE PREFERRED EMBODIMENTS

Figure 1:
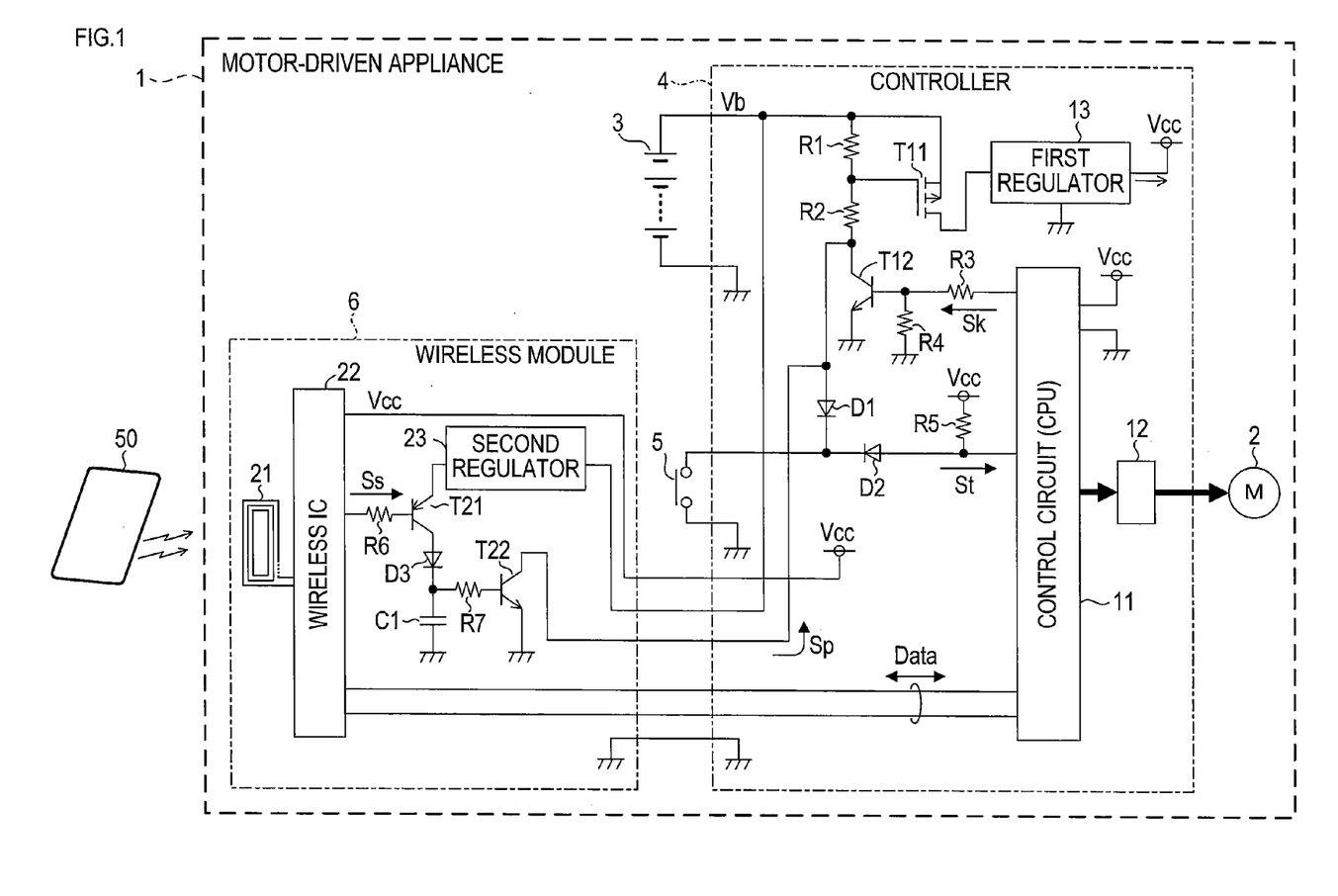
FIG. 1 is a circuit diagram showing an electrical configuration of a power-driven apparatus according to an embodiment.

As shown in FIG. 1, a motor-driven appliance 1 according to the present embodiment comprises a motor 2, a battery 3, a controller 4, a trigger switch 5, and a wireless module 6. The motor-driven appliance 1 according to the present embodiment is configured as one of motor-driven appliances of various types that are driven by power supplied from the battery 3, including, for example, rechargeable driver drills, rechargeable impact drivers, rechargeable impact wrenches, rechargeable mowers, rechargeable grinders, rechargeable circular saws, and rechargeable reciprocating saws.

The motor 2 is a drive source for operating (for example, rotating) a tool element not shown. There are many kinds of tool elements including, for example, driver bits, socket bits, rotary cutters, and blades, from among which such a tool element that suits the type of the motor-driven appliance 1 can be used.

The motor 2 is supplied with power of the battery 3 via the controller 4 (specifically, via a driver 12), and the supplied power rotates the motor 2. When the motor 2 rotates, the rotational force is transmitted to the tool element either directly or via a transmission mechanism to thereby bring the tool element into operation. The power-driven appliance 1 achieves its main function by operation of the tool element.

The battery 3 according to the present embodiment is a rechargeable battery that can be recharged repeatedly. The battery 3 may be incorporated in the power-driven appliance 1 or may be configured to be detachably attached to the motor-driven appliance 1.

The trigger switch 5 is a switch that is turned on and off by operation, by a user, of a not-shown trigger provided to the power-driven appliance 1. That is, the trigger switch 5 is turned on when a user pulls the trigger, and the trigger switch 5 is turned off when the user releases the trigger. Information showing an ON/OFF state of the trigger switch 5 is inputted to the controller 4. The power-driven appliance 1 comprises an analog output unit, which is not shown, that outputs information showing a pulled amount of the trigger as an analog signal. The analog signal from the analog output unit is also inputted to the controller 4.

The controller 4 operates with the power of the battery 3 and controls drive to the motor 2 corresponding to an operational state of the trigger. The controller 4 has a data communication function of performing data communication with an external device 50 via the wireless module 6.

The wireless module 6 has a function of performing wireless communication with the external device 50 and relays the data communication between the external device 50 and a control circuit 11 in the controller 4. In other words, the wireless module 6 has functions of outputting, to the control circuit 11 in the controller 4, data received wirelessly from the external device 50 and of transmitting wirelessly, to the external device 50, data outputted from the control circuit 11.

The controller 4 and the wireless module 6 will be described in more detail.

The controller 4 comprises the control circuit 11, the driver 12, and a first regulator 13. The first regulator 13 is inputted with a battery voltage Vb of the battery 3, generates a control voltage Vcc (a power-supply voltage having a voltage value of Vcc) from the battery voltage Vb, and supplies the control voltage Vcc to given components of the controller 4 and to the wireless module 6.

An activation transistor T11 is connected to a battery power conduction path from the battery 3 to the first regulator 13. The activation transistor T11 is provided to perform and stop supply of the battery voltage Vb to the first regulator 13, i.e., to perform and stop generation and output of the control voltage Vcc by the first regulator 13.

The activation transistor T11 according to the present embodiment is a P-channel MOSFET. More specifically, in the activation transistor T11, a source is connected to a positive electrode of the battery 3, and a drain is connected to a battery voltage input terminal of the first regulator 13. Between a gate and the source of the activation transistor T11 is connected a resistor R1. One end of a resistor R2 is connected to the gate of the activation transistor T11.

The other end of the resistor R2 is connected to one end of the trigger switch 5 via a diode D1. That is, the other end of the resistor R2 is connected to an anode of the diode D1, and a cathode of the diode D1 is connected to the one end of the trigger switch 5. The other end of the trigger switch 5 is connected to a ground line having the same potential as a negative electrode of the battery 3 does.

The other end of the resistor R2 is connected to a collector of a power holding transistor T12. The power holding transistor T12 according to the present embodiment is a bipolar NPN transistor, in which an emitter thereof is connected to the ground line. A base of the power holding transistor T12 is connected to a power holding signal output terminal of the control circuit 11 via a resistor R3 and also to the ground line via a resistor R4.

The other end of the resistor R2 is also connected to a collector of a second transistor T22 in the wireless module 6. The second transistor T22 according to the present embodiment is a bipolar NPN transistor, in which an emitter thereof is connected to the ground line.

The other end of the resistor R2 is thus connected to the ground line via the trigger switch 5, connected to the ground line also via the power holding transistor T12, and connected to the ground line further via the second transistor T22 in the wireless module 6.

Thus, when the trigger switch 5, the power holding transistor T12, and the second transistor T22 are all off, the other end of the resistor R2 is in a high-impedance state or has a potential higher than a potential of the ground line (hereinafter to be referred to also as a "ground potential") so that the activation transistor T11 is turned off. Thus, the battery voltage Vb of the battery 3 is not inputted to the first regulator T13, and operation of the first regulator 13 remains stopped so that no control voltage Vcc is generated.

When the trigger switch 5 is turned on, the potential of the other end of the resistor R2 becomes approximately the same as the ground potential, to thereby turn on the activation transistor T11. This allows the battery voltage Vb of the battery 3 to be inputted to the first regulator 13 via the activation transistor T11 so that the first regulator 13 is brought into operation to generate the control voltage Vcc.

When the power holding transistor T12 is turned on by a power holding signal Sk, which is to be described later, the potential of the other end of the resistor R2 also becomes approximately the same as the ground potential to thereby turn on the activation transistor T11. This allows the battery voltage Vb of the battery 3 to be inputted to the first regulator 13 via the activation transistor T11 so that the control voltage Vcc is generated in the first regulator 13.

When the second transistor T22 in the wireless module 6 is turned on, the potential of the other end of the resistor R2 also becomes approximately the same as the ground potential to thereby turn on the activation transistor T11. This allows the battery voltage Vb of the battery 3 to be inputted to the first regulator 13 via the activation transistor T11 so that the control voltage Vcc is generated in the first regulator 13.

In short, when any of the trigger switch 5, the power holding transistor T12, and the second transistor T22 is turned on, the activation transistor T11 is turned on so that the control voltage Vcc is generated in the first regulator 13.

When the second transistor T22 in the wireless module 6 is turned on, the collector of the second transistor T22 becomes to have approximately the same level of potential as the ground potential. In other words, an L (Low) level signal is outputted from the second transistor T22 to the other end of the resistor R2. The L level signal from the second transistor T22 to the resistor R2 is hereinafter referred to as a supply signal Sp. That is, while the second transistor T22 is on, the supply signal Sp (L level signal) is outputted from the second transistor T22 to the controller 4.

The driver 12 supplies the power of the battery 3 to the motor 2 according to a drive command inputted from the control circuit 11 to thereby rotationally drive the motor 2.

The control circuit 11 according to the present embodiment is configured with a microcomputer that comprises a CPU, a ROM, a RAM, any other memory, an I/O device, etc. The control circuit 11 operates with the control voltage Vcc generated in the first regulator 13. In other words, while the control voltage Vcc is generated in the first regulator 13, the generated control voltage Vcc is inputted to the control circuit 11 to thereby bring the control circuit 11 into operation. When the supply of the control voltage Vcc is stopped, operation of the control circuit 11 is stopped.

The one end of the trigger switch 5 is connected, via a diode D2, to a trigger signal input terminal of the control circuit 11 to which a trigger signal St is inputted. That is, the trigger signal input terminal of the control circuit 11 is connected to an anode of the diode D2, and a cathode of the diode D2 is connected to the one end of the trigger switch 5. The trigger signal input terminal of the control circuit 11 is connected to a supply line of the control voltage Vcc via a resistor R5, and thus is in a pulled-up state.

The trigger signal St inputted to the trigger signal input terminal while the control circuit 11 is in operation is an L level signal (signal having approximately the same level of potential as the ground potential) when the trigger switch 5 is on and is an H (High) level signal having a voltage higher than the L level signal does) when the trigger switch 5 is off. The control circuit 11 can obtain information on the ON/OFF state of the trigger switch 5 on the basis of the trigger signal St. Although it is not shown in the figure, the control circuit 11 is inputted also with the above-described analog signal corresponding to the pulled amount of the trigger so that the control circuit 11 can also obtain information on the pulled amount of the trigger.

The control circuit 11 outputs, to the driver 12, the drive command corresponding to the ON/OFF state of the trigger switch 5 and the pulled amount of the trigger, to thereby rotate the motor 2 at a rotational speed corresponding to the pulled amount of the trigger.

When the control circuit 11 is activated with the supply of the control voltage Vcc thereto, the control circuit 11 performs initial processing and proceeds to a normal operation. Included in the initial processing is a process of self-maintaining the control voltage Vcc. Specifically, this self-maintaining process is to start output of the power holding signal Sk from the power holding signal output terminal. The power holding signal Sk is a signal having a voltage level that can turn on the power holding transistor T12.

While the control circuit 11 is not in operation with no control voltage Vcc supplied thereto, the power holding transistor T12 is off because a potential of the power holding signal output terminal is the ground potential or is in an open state.

Turning on the trigger switch 5 or turning on the second transistor T22 in the wireless module 6 turns on the activation transistor T11. This enables the generation of the control voltage Vcc so that the control circuit 11 is activated to perform the self-maintaining process. When the power holding signal Sk is outputted from the power holding signal output terminal of the control circuit 11 by this self-maintaining process, the power holding transistor T12 is turned on.

Once the control circuit 11, after being activated, starts the output of the power holding signal Sk, the control circuit 11 continues the output of the power holding signal Sk until a given stop condition is satisfied. Thus, if the trigger switch 5 and the second transistor T22 are both turned off after a start of the output of the power holding signal Sk, the activation transistor T11 remains on as long as the power holding signal Sk is outputted so that the supply of the control voltage Vcc is continued.

The above-described stop condition can be defined in various manners. According to the present embodiment, however, it is defined such that an apparatus non-use state in which the motor-driven apparatus 1 is not in any use, operation, or the like (including the wireless communication with the external device 50) is continued for a given period of non-use time. After the control circuit 11 has been activated to start the output of the power holding signal Sk, the control circuit 11 stops the output of the power holding signal Sk when the stop condition is satisfied. When the control circuit 11 stops the output of the power holding signal Sk, the activation transistor T11 is turned off to thereby stop the operation of the first regulator 13. This stops the supply of the control voltage Vcc to the control circuit 11, to thereby stop the operation of the control circuit 11. Once the first regulator 13 is stopped by satisfaction of the stop condition, the stop condition is continued until either the trigger switch 5 is turned on or the second transistor T22 is turned on by a radio wave from the external device 50. It is to save the power of the battery 3 that the operation of the first regulator 13 is stopped by the satisfaction of the stop condition.

The control circuit 11 can perform the data communication with the external device 50 via the wireless module 6. The data communication between the control circuit 11 and the wireless module 6 can be performed via any appropriate system. In the present embodiment, however, it is serial communication.

The wireless module 6 comprises a coil 21, a wireless IC 22, and a second regulator 23. The coil 21 functions as an antenna for sending and receiving a radio signal (radio wave) in the wireless communication between the wireless module 6 and the external device 50. The wireless communication between the external device 50 and the wireless module 6 in the present embodiment is performed via a short-range wireless communication (so-called NFC (Near Field Communication)) system that meets the international standards of ISO/IEC 14443, the Japanese industrial standards of JISX6319-4, and so on.

NFC is a wireless communication system employing electromagnetic induction. When the coil 21 receives the NFC radio wave from the external device 50, the electromotive force is induced in the coil 21 by the received radio wave.

The wireless IC 22 mainly performs a process of relaying the data communication between the external device 50 and the control circuit 11. That is, when the wireless IC 22 receives the radio wave from the external device 50, the wireless IC 22 demodulates the data from the received radio wave and outputs the demodulated data to the control circuit 11 via serial communication. When the data to be transmitted are inputted from the control circuit 11 via serial communication, the wireless IC 22 modulates the data to send the modulated data through the NFC radio wave.

The wireless IC 22 basically operates with the control voltage Vcc supplied from the first regulator 13. The data communication between the wireless IC 22 and the control circuit 11 also is performed during the normal operation, when the wireless IC 22 is supplied with the control voltage Vcc. Even in a state where the wireless IC 22 is not supplied with the control voltage Vcc, however, when the external device 50 is brought into the vicinity of the coil 21 to induce the electromotive force in the coil 21, at least some of various functions of the wireless IC 22 can be performed by the electromotive force. One of the functions that can be performed by the electromotive force of the coil 21 is to output an activation signal Ss. When the wireless IC 22 starts its operation with the electromotive force of the coil 21 while the wireless IC 22 is not in operation with no control voltage Vcc supplied thereto, the wireless IC 22 outputs the activation signal Ss for a given period of time. The activation signal Ss is an L level signal.

An activation signal Ss output terminal of the wireless IC 22 is usually in the open state (high-impedance state). When the electromotive force of the coil 21 activates the wireless IC 22, the wireless IC 22 sets the activation signal Ss output terminal to L level for the given period of time. In other words, the wireless IC 22 outputs the activation signal Ss having an L-level voltage for the given period of time.

In the wireless module 6, the second regulator 23 generates a voltage for activation having a given voltage value on the basis of the battery voltage Vb and outputs the generated voltage for activation. The voltage for activation generated by the second regulator 23 is inputted to an emitter of the first transistor T21. The first transistor 21 is usually off, and is on only for the very short given period of time during which the above-described activation signal Ss is inputted. Thus, power consumed by the second regulator 23 is much smaller than power consumed by the first regulator 13 so that the power consumed by the second regulator 23 can practically be almost ignored though the battery voltage Vb is inputted to the second regulator 23 constantly.

A base of the first transistor T21 is connected to the activation signal Ss output terminal of the wireless IC 22 via a resistor R6. The first transistor T21 according to the present embodiment is a bipolar PNP transistor. The emitter of the first transistor T21 is connected to a voltage-for-activation output terminal of the second regulator 23. A collector of the first transistor T21 is connected to the ground line via a diode D3 and a capacitor C1.

That is, the collector of the first transistor T21 is connected to an anode of the diode D3, and a cathode of the diode D3 is connected to one end of the capacitor C1. The other end of the capacitor C1 is connected to the ground line. The one end of the capacitor C1 is also connected to a base of the second transistor T22 via a resistor R7.

Thus, when the activation signal Ss is outputted from the wireless IC 22, the first transistor T21 is turned on to apply the voltage for activation from the second regulator 23 to the base of the second transistor T22 via the diode D3 and the resistor R7, to thereby turn on the second transistor T22. When the second transistor T22 is turned on, the supply signal Sp is outputted from the second transistor T22 to the controller 4 to thereby turn on the activation transistor T11 in the controller 4 so that the control voltage Vcc is generated in and outputted from the first regulator 13, as described above.

While the first transistor T21 is on, the capacitor C1 is charged with (stores) power by the voltage for activation from the second regulator 23. The activation signal Ss is outputted from the wireless IC 22 for the given period of time. When the given period of time elapses from a start of output of the activation signal Ss, the output of the activation signal Ss is stopped to thereby turn off the first transistor T21.

Thus, the second transistor T22 cannot be in an ON state by the voltage for activation from the second regulator 23. However, after the first transistor T21 is turned to an OFF state, the ON state (i.e., the state where the supply signal Sp is outputted) of the second transistor T22 is continued by charged power of the capacitor C1 for a period of time corresponding to the charged power.

Among various operational examples of the motor-driven appliance 1 according to the present embodiment configured as above, an operational example will be described, using FIG. 2, of a case where the external device 50 is brought into the vicinity thereof in a state where the activation transistor T11 is off and thus the first regulator 13 is not in operation (in other words, in a state where control circuit 11 is not in operation).

Figure 2:
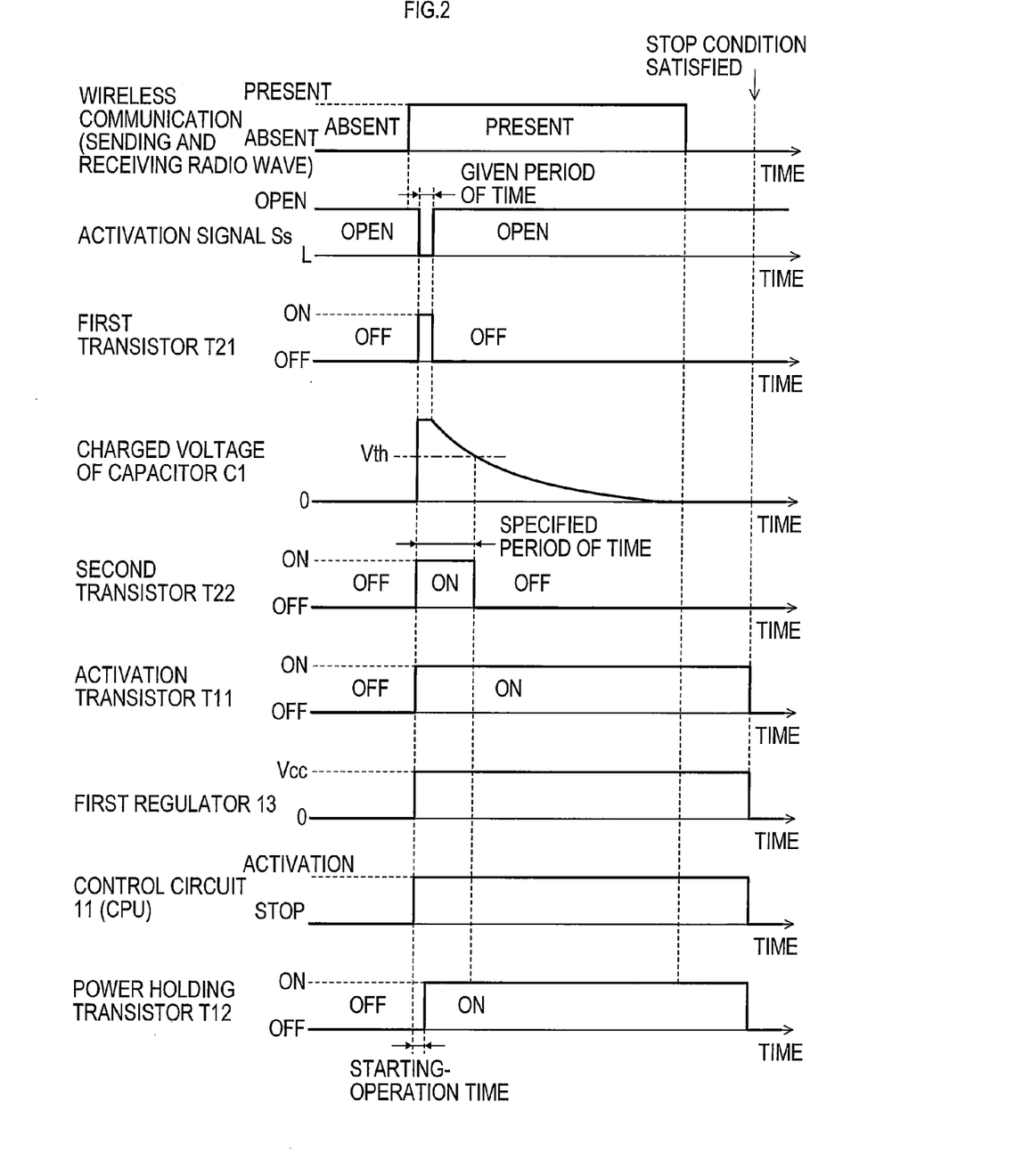
FIG. 2 is a time chart showing an operational example of the power-driven apparatus according to the embodiment.

As shown in FIG. 2, while the first regulator 13 is not in operation and no wireless communication with the external device 50 is performed because the external device 50 is not in the vicinity of the coil 21, no activation signal Ss is outputted from the wireless IC 22, and thus the activation signal Ss output terminal is in the open state.

In this state, when the external device 50 is brought into the vicinity of the coil 21 for the wireless communication between the external device 50 and the motor-driven appliance 1, the wireless communication is started. In more detail, first of all, the radio wave from the external device 50 is received to induce the electromotive force in the coil 21, and the induced electromotive force is inputted to the wireless IC 22. This allows the wireless IC 22 to start operation that uses the electromotive force as a power source and output the activation signal Ss (L level signal) for the given period of time.

When the activation signal Ss is outputted from the wireless IC 22, the first transistor T21 is turned to and kept in the ON state for the given period of time during which the activation signal Ss is outputted to the first transistor T21. While the first transistor T21 is on, the voltage for activation from the second regulator 23 turns the second transistor T22 to and keeps it in the ON state, and also charges the capacitor C1. With this charge, the capacitor C1 is charged to a given voltage (a voltage subtracting an ON voltage of the first transistor T21 and a forward voltage of the diode D3 from the voltage for activation provided from the second regulator 23).

After the output of the activation signal Ss is stopped, the ON state of the second transistor T22 is continued by discharge from the capacitor C1 to the second transistor T22. When the discharge from the capacitor C1 proceeds and the capacitor C1 has a charged voltage below a given threshold value Vth, the second transistor T22 is turned off. The period of time during which the second transistor T22 is on, i.e., the period of time during which the supply signal Sp is outputted is a specified period of time from when the second transistor T22 is turned on by the output of the activation signal Ss till when the second transistor T22 is turned off because the charged voltage of the capacitor C1 has fallen below the threshold value Vth.

When the second transistor T22 is turned to the ON state to output the supply signal Sp to the controller 4, the activation transistor T11 is turned on in the controller 4, to thereby bring the first regulator 13 into operation to start the supply of the control voltage Vcc. The supply of the control voltage Vcc activates the control circuit 11. When the control circuit 11 is activated, it performs the initial processing as described above and performs a process of outputting the power holding signal Sk as part of the initial processing. Some starting-operation time is required from activation of the control circuit 11 till the start of the output of the power holding signal Sk. The control circuit 11 outputs the power holding signal Sk when the starting-operation time elapses from the activation, to thereby turn on the power holding transistor T12.

In the present embodiment, the specified period of time described above during which the second transistor T22 is on is set to be equal to or longer than the starting-operation time required from the activation of the control circuit 11 till the start of the output of the power holding signal Sk. This ensures that the output of the power holding signal Sk is started while the second transistor T22 is on so that the supply of the control voltage Vcc is surely continued when the second transistor T22 is turned off.

The capacity of the capacitor C1 in the wireless module 6 is a capacity large enough to keep the second transistor T22 on for the specified period of time (i.e., large enough to output the supply signal Ss for the specified period of time) as a result of the above-described charge of the capacitor C1 for the given period of time.

When the control circuit 11 is activated, it performs the initial processing and proceeds to the data communication with the external device 50 via the wireless module 6. When the given stop condition is satisfied after the data communication between the control circuit 11 and the external device 50 has been completed to terminate the wireless communication between the wireless module 6 and the external device 50, the control circuit 11 stops the output of the power holding signal Sk to thereby turn off the power holding transistor T12. This turns the activation transistor T11 to the OFF state to stop the operation of the first regulator 13, to thereby stop the generation of the control voltage Vcc. Thus, the operation of the control circuit 11 is also stopped.

According to the motor-driven appliance 1 of the present embodiment described above, even in the state where the control circuit 11 is not in operation (in the power supply stop state) with no control voltage Vcc supplied thereto, it is possible to cause the coil 21 to receive the radio wave from the external device 50 to thereby bring the first regulator 13 into operation so that the control circuit 11 can be supplied with the control voltage Vcc. Thus, even in the power supply stop state, it is possible to activate the control circuit 11 to allow the data from the external device 50 to be transmitted to the control circuit 11 so that the control circuit 11 can receive the data from the external device 50.

Specifically in the present embodiment, NFC is employed as a communication system for the wireless communication between the external device 50 and the wireless module 6. Since NFC is wireless communication employing electromagnetic induction, the radio wave received by the coil 21 induces the electromotive force in the coil 21 so that the wireless IC 22 can output the activation signal Ss for the given period of time by the induced electromotive force.

That is, the activation signal Ss at least can be outputted, without consuming the power of the battery 3, by energy of the radio wave from the external device 50. This enables power saving of the motor-driven appliance 1 (in other words, reduction in power consumption of the battery 3).

When the wireless IC 22 starts its operation with the electromotive force from the coil 21, the wireless IC 22 outputs the activation signal Ss for the very short given period of time. The voltage for activation from the second regulator 23 turns on and keeps on the second transistor T22, and also charges the capacitor C1 for the given period of time. After the given period of time elapses to stop the output of the activation signal Ss, the ON condition of the second transistor T22 is continued for a while by the charged power of the capacitor C1.

Thus, even if the period of time during which the wireless IC 22 can output the activation signal Ss is limited to be shorter than the specified period of time during which the second transistor T22 should be on, the second transistor T22 can continuously be in the ON state for the specified period of time. Further, since the output of the activation signal Ss on the basis on the electromotive force in the coil 21 is performed only for the short period of time, energy consumed to output the activation signal Ss, out of energy received from the external device 50, can be reduced. This enables the second transistor T22 to be successfully kept in the ON state for the specified period of time and also enables the wireless communication between the wireless module 6 and the external device 50 (in other words, the data communication between the control circuit 11 and the external device 50) to be successfully performed.

When the control circuit 11 is activated, it performs the initial processing and outputs the power holding signal Sk. In other words, when the control circuit 11 is activated, it maintains the supply of the control voltage Vcc thereto by outputting the power holding signal Sk from itself. Thus, in the case where the control circuit 11 is activated because the second transistor T22 is turned on as a result of the wireless communication with the external device 50, the control circuit 11 can continue its operation when the second transistor T22, after being on for the specified period of time, is turned off again (i.e., when the supply signal Sp is stopped).

Specifically in the present embodiment, the period of time during which the second transistor T22 is on is equal to or longer than the starting-operation time required from when the second transistor T22 is turned on till when the control circuit 11 starts the output of the power holding signal Sk. This ensures the operation of the control circuit 11 to be continued when the second transistor T22 is turned off (when the supply signal Sp is stopped), to thereby perform the data communication between the control circuit 11 and the external device 50 normally.

In the present embodiment, the motor 2 corresponds to an example of a driving source of the present disclosure. The control circuit 11 corresponds to an example of a control unit of the present disclosure. The first regulator 13 corresponds to an example of a power supply unit of the present disclosure. The activation transistor T11 corresponds to an example of a switch unit of the present disclosure. In the wireless module 6, the capacitor C1 corresponds to an example of a power storage unit of the present disclosure, and a circuit configured with the second regulator 23, the first transistor T21, the diode D3, the resistor R7, and the second transistor T22 corresponds to an example of a signal output control unit of the present disclosure. A circuit configured with the capacitor C1, the second regulator 23, the first transistor T21, the diode D3, the resistor R7, and the second transistor T22 corresponds to an example of a supply signal output unit of the present disclosure. The coil 21 and the wireless IC 22 correspond to an example of a receiving unit of the present disclosure. The wireless IC 22 also corresponds to an example of a data communication unit and an activation operation unit of the present disclosure. The output of the activation signal Ss by the wireless IC 22 corresponds to an example of an activation operation of the present disclosure. The power holding transistor T12 corresponds to an example of a power holding unit of the present disclosure.

Other Embodiments (1) A specific circuit configuration of the wireless module 6 for outputting the supply signal Sp (in other words, for turning on the activation transistor T11 of the controller 4) by receipt of the radio wave from the external device 50 is not limited to the circuit configuration shown in FIG. 1. Any other circuit configuration can be employed that can output, for a required period of time or longer, the supply signal Sp for turning on the activation transistor T11 according to the activation signal Ss from the wireless IC 22.

For example, a self-maintaining circuit for maintaining the ON state of the first transistor T21 for the specified period of time may be provided so that, after the activation signal Ss from the wireless IC 22 has turned on the first transistor T21, the ON state of the first transistor T21 is continued even when the activation signal Ss is stopped. In such a case, the capacitor C1 is not necessary.

For another example, in a case where the wireless IC 22 can continuously output, directly to the second transistor T22 for a required period of time or longer, an activation signal that can turn on the second transistor T22, the activation signal may be inputted from the wireless IC 22 directly to the base of the second transistor T22. In such a case, the second regulator 23 and the capacitor C1 are not necessary.

(2) In the present embodiment, NFC has been described as an example of a wireless communication system between the external device 50 and the wireless module 6. However, it is not essential that the wireless communication system should be NFC, and any other type of wireless communication system can also be employed.

It is not essential that the radio wave should be used as a medium to send and receive the radio signal, either. For example, optical communication using visible light or infrared communication using infrared light may be used for the wireless communication. Thus, the electromagnetic wave used as a medium of the wireless communication should not be limited to the NFC radio wave.

In a case where the wireless communication is conducted via optical communication, a specific configuration, for example, including a light-emitting device for sending data and a light-receiving device, such as a photodiode or phototransistor, for receiving data in each of a motor-driven appliance and an external device enables the optical communication. In such a case, a circuit that photoelectrically converts received light energy to generate the activation signal Ss may be provided so that the activation signal Ss is generated from light energy.

In communication other than the optical communication described above, it is also possible to obtain electric power from an electromagnetic wave to use the obtained power to, for example, output the activation signal Ss in a manner corresponding to the type of the electromagnetic wave sent and received. For example, a rectenna, which generates power from a received radio wave, has already been well known and has been in practical use. Electric power can be generated from a received radio wave by utilizing the rectenna technique, depending on the type of the radio wave and the power used in the wireless communication.

(3) It is merely an example to use a circuit having the power holding transistor T12 as its main component, as a circuit for the continued supply of the control voltage Vcc to and by the control circuit 11. Any other specific circuit configuration is possible that allows the control circuit 11 to continue the supply of the control voltage Vcc to itself for a required period of time or longer, irrespective of presence or absence of the supply signal Sp from the wireless module 6.

In the above-described embodiment, the transistor T11 is provided to a path leading to a battery-voltage input terminal of the first regulator T13 in order to supply and stop the control voltage Vcc to the control circuit 11. However, such a circuit configuration is also a mere example. For example, a transistor may be provided to a path through which the control voltage Vcc is outputted from the first regulator 13 so that the supply of the control voltage Vcc to the control circuit 11 is performed and stopped by turning the transistor on and off.

(4) The power-driven appliance 1 according to the above-described embodiment comprises the motor 2 as a drive source. However, the present disclosure can be applied also to a power-driven appliance that comprises a drive source other than the motor 2.

(5) The battery 3 of the power-driven appliance 1 according to the above-described embodiment is a rechargeable battery, but the battery 3 may be a primary battery. The present disclosure can be applied also to a power-driven appliance that can operate with a power source other than a battery (such as an AC 110-230V power source).

(6) In the above-described embodiment, the control circuit 11 is configured with a microcomputer. However, the control circuit 11 may be configured with a combination of various individual electronic components, may be an ASIC (Application Specified Integrated Circuit), may be a programmable logic device such as a FPGA (Field Programmable Gate Array), or may be a combination thereof.

(7) Further, a function of a component of the above-described embodiment may be distributed to a plurality of components, and functions of a plurality of components may be integrated in a component. At least part of the configuration of the above-described embodiment may be replaced with a known configuration having the same function. Part of the configuration of the above-described embodiment may be omitted. At least part of the configuration of the above-described embodiment may be added to or replaced with the configurations of the above-described other embodiments. Any embodiment that is included in technical ideas specified only by the wording of the claims is an embodiment of the present disclosure.

What is claimed is:

1. A motor-driven appliance comprising:
   a drive source configured to drive a tool;
   a control unit configured to control operation of the drive source and to obtain data wirelessly transmitted from an external device;
   a power supply unit configured to generate a control voltage for operating the control unit;
   a switch unit configured to supply the control voltage to the control unit and to stop supply of the control voltage to the control unit so that the control voltage is supplied to the control unit at least while a given supply signal is inputted to the switch unit;
   a receiving unit configured to receive an electromagnetic wave transmitted from the external device;
   a supply signal output unit configured to output, to the switch unit, the supply signal for supplying the control voltage to the control unit when the receiving unit receives the electromagnetic wave while the supply of the control voltage to the control unit is stopped by the switch unit; and
   a data communication unit configured to output, to the control unit, the data contained in the electromagnetic wave received by the receiving unit.

2. The motor-driven appliance according to claim 1, wherein the receiving unit comprises:
   a coil configured to receive the electromagnetic wave; and
   an activation operation unit configured to perform a given activation operation to cause the supply signal output unit to output the supply signal by an electromotive force induced in the coil by the electromagnetic wave received by the coil.

3. The motor-driven appliance according to claim 1,
wherein the supply signal output unit is configured to output the supply signal for a specified period of time when the receiving unit receives the electromagnetic wave while the supply of the control voltage to the control unit is stopped by the switch unit.

4. The motor-driven appliance according to claim 3,
wherein the specified period of time is equal to or longer than a starting-operation time required from when output of the supply signal is started till when the control unit is activated with the supply of the control voltage thereto from the power supply unit and the control unit starts a specific operation.

5. The motor-driven appliance according to claim 4, comprising a power holding unit configured to cause the switch unit to continue the supply of the control voltage to the control unit while a given power holding signal is outputted from the control unit, irrespective of presence or absence of the output of the supply signal from the supply signal output unit,
wherein the control unit is configured to start outputting the power holding signal after being activated and, when a given stop condition is satisfied, stops output of the power holding signal, and
wherein the specific operation is to output the power holding signal.

6. The motor-driven appliance according to claim 1, comprising a battery that supplies, to the drive source and the power supply unit, power for operating the drive source and the power supply unit,
wherein the supply signal output unit comprises:
a power storage unit configured to be capable of storing electric power; and
a signal output control unit configured to start output of the supply signal by power based on the battery and also to cause the power storage unit to store power by the power based on the battery for a given period of time, when the receiving unit receives the electromagnetic wave while the supply of the control voltage to the control unit is stopped by the switch unit, so that, after the given period of time has elapsed, the output of the supply signal is continued by power stored in the power storage unit for a period of time corresponding to a stored amount of power.

7. The motor-driven appliance according to claim 6,
wherein the receiving unit is configured to output a given activation signal to the signal output control unit for a given period of time when the electromagnetic wave is received, and
wherein the signal output control unit is configured to cause the power storage unit to store power while the activation signal is inputted from the receiving unit.

8. The motor-driven appliance according to claim 6,
wherein a power storage capacity of the power storage unit comprises a capacity to store, by power storage for the given period of time, power that allows the supply signal output unit to output the supply signal for the specified period of time from a start of the output of the supply signal.

* * * * *